March 31, 1931.     H. P. ROBERTS     1,798,757
EGG BEATER AND MIXER
Filed Dec. 3, 1927
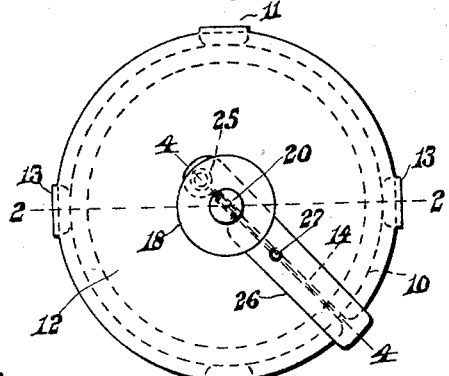
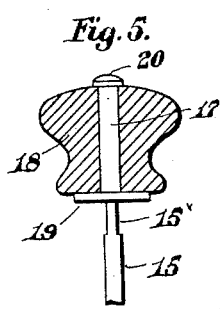
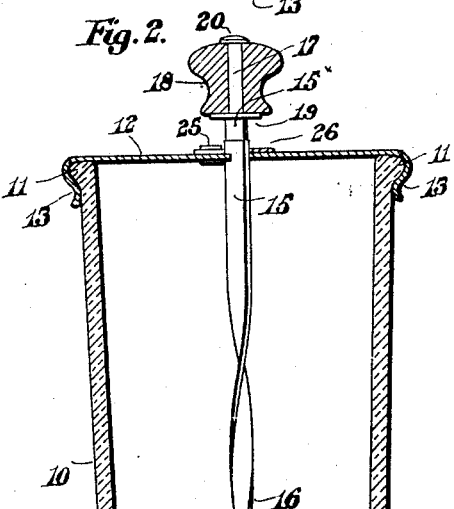
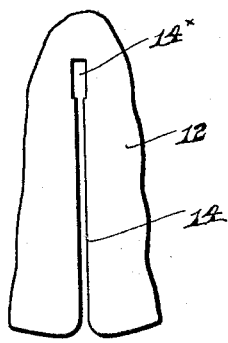
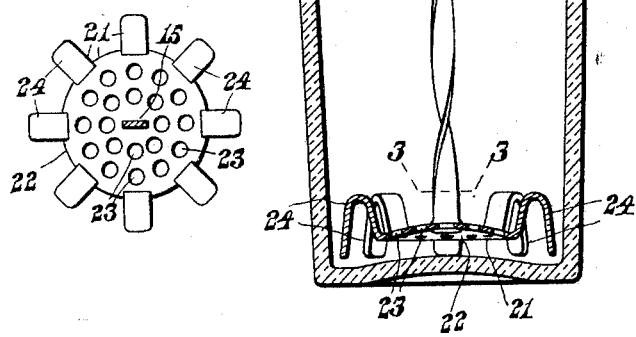
Inventor:
Henry P. Roberts,
by Walter E. Lombard, Atty.

Patented Mar. 31, 1931

1,798,757

UNITED STATES PATENT OFFICE

HENRY P. ROBERTS, OF ROXBURY, MASSACHUSETTS, ASSIGNOR OF ONE-HALF TO JAMES A. WILLEY AND ONE-HALF TO FRANKLIN S. FRISBEE, BOTH OF BOSTON, MASSACHUSETTS

EGG BEATER AND MIXER

Application filed December 3, 1927. Serial No. 237,418.

This invention relates to improvements in egg beaters and mixers for beating eggs, whipping cream and mixing various milk and chocolate drinks, salad dressings and other liquid mixtures.

One of the objects of the invention is to provide a device which is simple, perfectly sanitary and efficient, and comprised of parts which may be readily assembled and unassembled, so as to permit easy handling and cleaning.

Another object is to provide a cover for the jar having a radial slot, in which a spiral bar adapted to be moved up and down and carrying a beater member is inserted and centered, together with particularly efficient agitating and mixing means extending from the beater member, comprising a plurality of inverted U-shaped wings.

Another object is to provide the beater member with an upwardly concaved and perforated suction or aerating chamber, whereby the contents of the jar will be drawn upward and thus aerated by forcing air through the mixture as the beater member moves up and down.

A still further object is to extend the ends of the inverted U-shaped wings of the beater member below the plane of the edge of the beater member, by which means the mixture is whirled within the area formed by the circular path of the rotating ends of the wings and directed toward the concaved suction chamber, thereby greatly facilitating the beating, whipping or mixing of the contents of the jar.

Another object is to provide the cover with a pivoted plate adapted to cover the radial slot in the cover and prevent the escape of the mixture being stirred within the jar.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described.

Of the drawings:

Figure 1 represents a plan of a device embodying the principles of the present invention.

Figure 2 represents a vertical section of same on line 2, 2, on Fig. 1.

Figure 3 represents a horizontal section of the beater, on line 3, 3, on Fig. 2.

Figure 4 represents a section of the cover on line 4, 4, on Fig. 1.

Figure 5 represents an elevation of the upper end of the actuating bar or member and showing in section the knob mounted thereon, and Figure 6 represents a plan of a portion of the cover plate and showing the radial slot therein communicating at its inner end with a widened opening for the actuating bar.

Similar characters indicate like parts throughout the several figures of the drawing.

In the drawings 10 designates a glass receptacle having a bead 11 at the top thereof on its outer surface.

Resting on the upper edge of the glass 10 is a flat metal cover 12 having a plurality of downwardly extending yielding ears 13 which coact with the bead 11 to retain said cover 12 in contact with said upper edge.

The cover 12 has a radial slot 14 formed therein, the inner end of which extends slightly beyond the center of said cover.

Disposed in this cover 12 is a flat bar 15 the lower portion of which has a twist 16 therein.

Projecting upwardly from the bar 15 is a cylindrical stem 17 surrounded by a knob 18 freely rotatable about said stem.

Between the lower end of the knob 18 and the cover 12 is a washer 19 surrounding said stem 17.

The upper end of the stem 17 is provided with a head 20 preventing the displacement of the knob 18.

Riveted to the lower end of the bar 15 and rotatable therewith is the beater member 21.

This beater 21 is composed of a disk portion 22 concaved upwardly and provided with a plurality of perforations 23 through which the material being operated may pass when the beater 21 is moved upwardly and downwardly in the glass receptacle 10.

From the edge of the disk portion 22 of the beater 21 extend a plurality of wings 24.

These wings 24 project upwardly and are then curved outwardly and downwardly to a point below the edge of the disk portion 22 of the beater 21.

The cover 12 may be quickly removed from the receptacle 10 to permit the latter to be filled with the material to be stirred.

The cover is then replaced and the spring ears 13 will hold the cover firmly in place so that it cannot be accidentally displaced.

Pivoted at 25 to the top of the cover 12 is a flat plate 26 adapted to close the slot 14 and prevent the escape of material through said slot 14. This plate 26 is provided with a projection 27 adapted to enter the slot 14 and retain said plate above the slot 14 when the device is being used.

The outer end 28 of the plate 26 extends beyond the edge of the cover 12 so that the operator may press thereon with the thumb to move the plate about its pivot 25 and uncover the slot 14 when it is desired to remove the cover from the beater bar 15.

With the cover 12 in position on the receptacle the operator grasps the knob 18 and raises and lowers it and as the twisted portion 16 of the bar 15 passes through the slot 14 the beater 21 will be revolved first in one direction and then in the opposite direction.

During the reciprocatory movement of the beater 21 the material will be thoroughly divided as it passes through the perforations 22 and during the rotary movement of the beater 21 the wings 24 will stir up the material.

By these combined movements the beating of the material may be accomplished readily and most effectually.

When this work has been accomplished, the cover 12 may be removed from the receptacle 10 and then the cover may be detached from the bar 15, thus permitting a thorough cleaning of the receptacle 10, the beater 21 and its bar 15, and the cover 12 and parts connected therewith.

The device may thus be kept in a perfectly sanitary condition at all times.

Preferably the inner end of the slot 14 is widened as shown in Fig. 6, forming a rectangular opening 14x to which the flat bar 15 is nicely fitted so that it is always retained in the center of cover 12 when the device is in operation.

At the upper end of the bar 15 below the washer 19 is a reduced portion 15x the thickness of which is slightly less than the width of slot 14.

When the cover 12 is removed the bar 15 may be pushed down until the reduced portion 15x registers with the thickness of the cover and then the bar 15 may be disconnected from the cover by passing the reduced portion 15x through the slot 14.

An important feature of the invention is the functioning of the upwardly concaved portion of the disk portion 22, which forms a suction chamber, whereby the material being mixed will be sucked or drawn upward and aerated by thus forcing by way of the openings 23 air through the mixture, in conjunction and co-operation with the operation of the wings 24 in whirling the mixture around in alternate directions and directing the mixture to the suction chamber, whereby, in consequence of the interdependent operations of whirling the mixture and directing it to the suction chamber as accomplished by the wings 24 and the sucking upward and aerating of the mixture of the suction chamber, the mixing of the material being mixed will be greatly facilitated and quickened.

Another important feature of the invention is the arrangement and construction of the radially extending wings 24 of the disk portion 22, which on account of their particular inverted U-shaped construction and disposition from the disk portion 22 constitute especially efficient agitating means for stirring the material in the receptacle, while the rapid rotating motion imparted by the spiral or twisted portion 16 to the beater 21 in alternate directions cause the material being stirred to be very effectively and rapidly mixed.

If so desired, the edges of the rectangular opening 14x, which are parallel to the edges of the radial slot 14 may be bent downward, thereby serving the dual purpose of acting as guides for the spiral bar 15 and as means for aiding in maintaining the bar 15 in a vertical position as it is moved up and down in the rectangular opening 14x of the cover 12.

It is believed that the operation and many advantages of the invention will be understood without further description.

Having thus described my invention, I claim:

1. In an egg beater and mixer the combination of a receptacle, a cover therefor provided with means for securing it to said receptacle and having a radial slot extending from its center to the edge thereof, a beater member within said receptacle, a flat twisted bar secured to said beater member and extending through said slot, and a knob revolubly mounted on the upper end of said bar.

2. In an egg beater and mixer the combination of a receptacle, a cover therefor provided with means for securing it to said receptacle and having a radial slot extending from its center to the edge thereof, a beater member within said receptacle, a flat twisted bar secured to said beater member and extending through said slot, the upper end of said bar having a cylindrical stem formed thereon, and a knob revolubly mounted on said stem.

3. In an egg beater and mixer the combination of a receptacle, a cover therefor provided with means for securing it to said receptacle and having a radial slot extending from its center to the edge thereof, a beater member within said receptacle, a flat twisted bar secured to said beater member and extending through said slot, a plate pivoted to said cover and adapted to close said slot, and a knob revolubly mounted on the upper end of said bar.

4. In an egg beater and mixer the combination of a receptacle, a cover therefor provided with means for securing it to said receptacle and having a radial slot extending from its center to the edge thereof, a beater member within said receptacle, a flat twisted bar secured to said beater member and extending through said slot, a plate pivoted to said cover and adapted to close said slot, said plate having a projection adapted to enter said slot when in closed position, and a knob revolubly mounted on the upper end of said bar.

5. In an egg beater and mixer the combination of a receptacle, a cover therefor provided with means for securing it to said receptacle and having a radial slot extending from its center to the edge thereof, a beater member within said receptacle, a flat twisted bar secured to said beater member and extending through said slot, a plate pivoted to said cover and adapted to close said slot, said plate having a notch to receive said bar and prevent movement thereof endwise of said slot, and a knob revolubly mounted on the upper end of said bar.

6. In an egg beater and mixer the combination of a receptacle, a cover therefor provided with a radial slot, a flat bar extending through said slot and having a twist in its lower portion, a beater disk secured to the lower end of said bar and provided with a plurality of perforations, and means for reciprocating said bar.

7. In an egg beater and mixer the combination of a receptacle, a cover therefor provided with a radial slot, a flat bar extending through said slot and having a twist in its lower portion, a beater disk secured to the lower end of said bar and provided with a plurality of perforations and wings extending from the edge thereof, and means for reciprocating said bar.

8. In an egg beater and mixer the combination of a receptacle, a cover therefor provided with a slot with parallel edges, a flat bar extending through said slot and having a twist in its lower portion, a beater disk secured to the lower end of said bar and provided with a plurality of perforations and wings extending upwardly and then downwardly from the edge thereof, and means for reciprocating said bar.

9. In an egg beater and mixer the combination of a receptacle, a cover therefor provided with a radial slot, a flat bar extending through said slot and having a twist in its lower portion, a beater disk secured to the lower end of said bar and provided with a plurality of perforations, and a knob revolubly mounted upon the upper end of said bar.

10. In an egg beater and mixer the combination of a receptacle, a cover therefor provided with a rectangular opening at its center and having a narrow slot radiating therefrom to the edge of the cover, a flat bar disposed in said opening having a twist in its lower portion and at its upper end provided with a reduced portion adapted to pass lengthwise of said slot, a beater disk secured to the lower end of said bar, and a knob revolubly mounted upon the upper end of said bar.

11. In an egg beater and mixer the combination of a receptacle, a cover therefor provided with a rectangular opening at its center and having a narrow slot radiating therefrom to the edge of the cover, a flat bar disposed in and fitting said opening having a twist in its lower portion and at its upper end provided with a reduced portion adapted to pass lengthwise of said slot, a beater disk secured to the lower end of said bar, and a knob revolubly mounted upon the upper end of said bar.

12. In an egg beater and mixer the combination of a receptacle, a cover therefor provided with a radial slot, a bar extending through the said slot and having a substantial portion formed into a spiral, and a beater disk secured to the lower end of the said bar provided with a concaved suction or aerating chamber.

13. In an egg beater and mixer the combination of a receptacle, a cover therefor provided with a slot, a bar extending through the said slot and provided with reciprocating means, and a beater disk secured to the lower end of the said bar provided with a plurality of radially disposed, inverted U-shaped wings extending upwardly and then downwardly.

14. In an egg beater and mixer the combination of a receptacle, a cover therefor provided with a radial slot, a bar extending through the said slot and provided with reciprocating means, and a beater disk secured to the lower end of the said bar provided with a perforated, concaved suction or aerating chamber.

15. In an egg beater and mixer the combination of a receptacle, a cover therefor provided with a radial slot, a spiral bar extending through said slot and co-operating therewith in imparting a rotary movement to a beater member attached to the spiral bar, and radially disposed and inverted, downwardly extending beater members on the said beater member.

16. In an egg beater and mixer, a central beater member provided with a concaved, perforated suction or aerating chamber, and a plurality of radially disposed, inverted U-shaped wings extending upwardly and then downwardly.

17. In an egg beater and mixer, a central beater member provided with a concaved, perforated suction or aerating chamber, and a plurality of inverted, U-shaped wings radially disposed from the said beater member, the said wings extending upwardly and then downwardly to a point below the edge of the said beater member.

Signed by me at 746 Old South Bldg., Boston, Massachusetts, this 1st day of December, 1927.

HENRY P. ROBERTS.